UNITED STATES PATENT OFFICE.

IRA H. JEWELL, OF CHICAGO, ILLINOIS.

COAGULANT AND PROCESS OF MAKING SAME.

SPECIFICATION forming part of Letters Patent No. 681,882, dated September 3, 1901.

Application filed August 30, 1900. Serial No. 28,583. (No specimens.)

*To all whom it may concern:*

Be it known that I, IRA H. JEWELL, of Chicago, in the county of Cook and State of Illinois, have invented certain new and useful Improvements in Coagulant Compositions of Matter and Processes of Producing the Same; and I do hereby declare that the following is a full, clear, and exact description thereof.

This invention is for coagulant compositions of matter and processes for their manufacture, the object of which is to prepare an insoluble coagulant for the purification of water and other impure liquids which will be free from acid, but of a gelatinous, bulky, and flocculent nature when mixed with water, so that its action thereon will be of a mechanical effect.

The material and process forming the basis of this invention have special reference to the separation from water of the deleterious or objectionable matters contained therein in suspension, and in this specification I shall practically confine myself to a consideration of water purification, though it will be understood that the invention is applicable to the purification of sewage or of liquids other than water.

This invention consists in matters hereinafter set forth, and more particularly pointed out in the appended claims.

There are many waters which do not contain sufficient alkalinity to allow decomposition of alumina sulfate, wherein the reaction can take place within the water, and thus precipitate the alumina-hydrate flocks, and even when this is true and there should be enough alkalinity present to do so such treatment of water for purification of city water-supplies is very objectionable because of the chemical treatment and also because the sulfate of alumina hardens the water.

I am aware that double chemical reactions have been used in various manipulations to overcome as much as possible the above objections of hardening the water or causing the failure of a coagulant to act when the water is lacking of its alkalinity; but in all of these attempts chemical reaction has taken place upon the water, or when the chemicals are mixed separately and fed into the water the expense of the double chemical treatment is involved whether the reaction takes place within or separately from the water, aside from the great care and attention which must be given in regulating the correct proportions. Moreover, the great prejudice of consumers due to possible injury which they fear from water when purified by such chemical treatment results in many cases in failure to secure the adoption of water-purification systems. With my new invention I avoid these objections and provide a coagulant which has also the advantage of being cheap to manufacture, easy to handle, and possesses all the qualities which are required for rapid filtration through sand or for sedimentation of water impurities in settling-basins. For example, my coagulant can be mixed with distilled water in either a large or small amount and cause a flocculent gelatinous condition to exist of alumina hydrate, which will be bulky, and thereby possess the power to entangle or enmesh floating particles of clay, bacteria, or other foreign matter found in water. When used in a settling-chamber, the alumina hydrate will settle and carry down with it a large amount if not all of the suspended impurities contained in the water, or if used in conjunction with a filter having sand or any other granular filtering material will permit a high velocity of filtration to take place, thereby producing the desired result by a mechanical effect instead of by a chemical one, as has been the practice heretofore.

This composition of matter consists, preferably, of trihydrate of alumina with a certain quantity of sodium carbonate mixed therewith in a manner which permits the alumina hydrate to be dried out to the sight and touch, while the product assumes a flocculent or gelatinous state when mixed with water. The trihydrate or alumina may be prepared by precipitation of the alumina from the sulfate of alumina by the addition of sufficient carbonate of sodium to the alumina sulfate when dissolved with sufficient water, by then filtering off or otherwise separating the resultant liquid, which is sodium sulfate, then adding to the trihydrate of alumina while in a moist condition a quantity of carbonate of sodium— say five to twenty-five per cent., more or less— and then drying it under low atmospheric temperature—say 50° Fahrenheit, more or less. It is possible that my product can be prepared by the addition of sufficient sodium carbonate at the outset when precipitating the trihydrate from the alumina sulfate and then dry out the product, as previously cited, or upon pans, or by a centrifugal, and thereby avoid the need of a secondary application.

In the preparation of my product according to the foregoing statement of how I prefer to make it the product will be dry to the sight and touch and in this condition can be handled commercially. When mixed with water, however, it assumes or resumes practically the same gelatinous or flocculent condition as before drying.

It is difficult at this time to explain just how it is that the addition of sodium carbonate to alumina trihydrate allows it to be dried out to the sight and touch and still causes it to maintain or resume its gelatinous quality or to explain at this time what I would consider the best proportion of sodium carbonate to employ in this product. I have prepared samples of this product made with varying quantities of sodium carbonate, both under low and high artificial temperatures, used in drying and admixing the sodium carbonate with the alumina trihydrate as a precipitate, and also while in solution, and find that various qualities of a gelatinous hydrate exist, some of which under some circumstances might be used commercially; but I do not consider them so desirable as the product which is prepared as heretofore stated, because I have found the gelatinous quality obtained otherwise to be less bulky and more difficult to admix quickly with water, some of which would require that it would even have to pass through rolls to become fine enough for use. While I have above indicated in what manner I prefer to prepare this product, I do not wish to limit myself to any specific way of doing so or to any certain proportions of the mixture or temperatures employed, so long as the product obtained has substantially the characteristics above set forth. I wish to explain, however, that I believe an aluminium trihydrate will be the best quality of gelatinous and bulky flock of the alumina; in other words, that the condition of trihydrate is the best. A dihydrate of alumina has probably been made with some of the foregoing mixtures, which, while gelatinous, is more difficult to easily and quickly mix with water and in which the flock produced is not as bulky or of the good quality as is the trihydrate of alumina, which I therefore prefer to use. If we now drive off still another part of the water of hydration of alumina and cause it to be a mon-alumina hydrate, it will exist in a granular form, and this product is found to exist very abundantly in nature under what is known as "diaspore" ($Al_2O_3H_2O$.) In other words, I have prepared various products of alumina hydrate both with and without sodium and after careful thought and study upon the question believe that while a monhydrate of alumina will be granular a dihydrate will be gelatinous, but not so bulky and good as the alumina trihydrate, which in this condition contains the full amount of the water of hydration. I find by the addition of a small amount of sodium carbonate that I can dry out the alumina trihydrate so that it will appear to the sight and touch to be dry and when mixed with water possess the bulky, gelatinous, flocculent, and good qualities as if it were originally contained in the trihydrate form as a precipitant from the aluminium sulfate, so that I am able to prepare a cheap and inexpensive and good quality of coagulant heretofore unknown.

It is possible to prepare basic alumina hydrate by electrolysis and prepare my product by then adding the sodium carbonate, the same as though the alumina hydrate were prepared as a precipitant of the alumina sulfate. It is also possible to substitute sodium chlorid or some other alkaline salt for the carbonate of soda in preparing my product, though I cannot say at this time that this will be so satisfactory. I mention the foregoing as a possible substitute for the sodium carbonate and the method of electrolysis for preparing the alumina hydrate, which latter of course will be a metallic alumina hydrate and made directly from the metal plates, though at this time it is impossible to say that the product resulting would be so satisfactory. I therefore do not wish to confine myself to any particular way of preparing the alumina hydrate nor to any particular substance, such as the carbonate of sodium, in order to dry out my product sensibly to the touch and sight, so that it will in this condition assume its gelatinous, bulky, and flocculent nature when mixed with water; nor do I wish to confine myself specifically to the use of alumina as a base.

I wish to mention here that one of the reasons I prefer the use of alumina as a base is that its specific gravity is very low, and therefore its bulky state when gelatinous and flocculent will be more bulky than materials of higher specific gravity. I also prefer alumina as a base because it will not be dissolved or acted upon by carbonic-acid gas, which abounds largely in the natural waters. In times of freshet, when river-waters have passed through farm regions, owing to the formation of carbonic-acid gas by the decomposition of vegetable matters deposited on the soil and which gas is carried to the river by the rainfall there would be great liability of certain bases upon which the carbonic-acid gas will act being dissolved and carried away with the water, and this is especially true of certain forms of iron.

An alumina base for a coagulant such as I prepare conforms quite with nature's way of purifying water, since the percentage of alumina in the earth's crust, as far as it is known to us, is 7.81, and it exists more abundantly than any other element.

I believe that my invention will be of great utility in the paper-making industry, wherein the sizing of paper is accomplished now by the use of alumina sulfate, as by substituting a gelatinous alumina free from acid the quality of the paper will be better and more durable by reason of no acid reaction upon it. While I know of no recognized fault of sizing paper with alumina sulfate so far as the process of sizing is concerned, yet it is common knowledge that papers made from wood-pulp, wherein large amounts of sulfur are used in the digesters in preparing pulp-fibers, are objected to because of their premature aging, and it is possible, therefore, that this condition exists, only in a less degree, in the use of alumina sulfate on linen paper.

Having herein described my invention, what I claim as new, and desire to secure by Letters Patent, is—

1. A coagulant for the separation of impurities from liquid, consisting of a basic hydrate and an alkaline salt, the product being dry to the sight and touch and assuming a flocculent condition when mixed with water.

2. A coagulant consisting of a basic hydrate, practically free from acid deleterious to the liquid to be treated, and an alkaline salt; the coagulant being dry to the sight and touch and assuming a flocculent condition when mixed with water.

3. A coagulant for the separation of impurities from liquids, which consists of alumina hydrate as a base and an alkaline salt; the coagulant being dry to the sight and touch and assuming a flocculent condition when mixed with water.

4. A coagulant for separating impurities from liquids, which consists of a basic hydrate and sodium carbonate, the coagulant being dry to the sight and touch and assuming a flocculent condition when mixed with water.

5. A coagulant for separating solids from liquids, which consists of alumina trihydrate and an alkaline salt the product being dry to the sight and touch and assuming a flocculent condition when mixed with water.

6. The process of preparing a coagulant which consists in first obtaining a basic hydrate; then adding thereto an alkaline salt while the basic hydrate is in a moist condition; then drying the substance while retaining its property to become flocculent when mixed with water.

7. The process of making a coagulant which consists in first preparing a basic hydrate of alumina in a flocculent form; then adding an alkaline salt; then drying the substance while retaining its property to become flocculent when mixed with water.

8. The process of making a coagulant which consists in preparing alumina trihydrate by the addition of sodium carbonate with water to the alumina sulfate; then removing the liquid; then adding sodium carbonate to the precipitate; then drying the substance while retaining its property to become flocculent when mixed with water.

9. A composition of matter consisting of trihydrate of alumina and sodium carbonate, the product being dry to the sight and touch, and assuming a flocculent condition when mixed with water.

In testimony that I claim the foregoing as my invention I affix my signature, in presence of two witnesses, this 30th day of August, A. D. 1900.

IRA H. JEWELL.

Witnesses:
  C. A. NEALE,
  WILLIAM L. HALL.